United States Patent [19]
Greene et al.

[11] Patent Number: 6,002,349
[45] Date of Patent: Dec. 14, 1999

[54] HELICOPTER ANTI-TORQUE LIMIT WARNING DEVICE

[75] Inventors: Leonard M. Greene, White Plains, N.Y.; Randall A. Greene, Boulder, Colo.

[73] Assignee: Safe Flight Instrument Corporation, White Plains, N.Y.

[21] Appl. No.: 09/133,964

[22] Filed: Aug. 14, 1998

[51] Int. Cl.$^6$ .................................................. G08B 23/00
[52] U.S. Cl. .................. 340/965; 340/407.1; 340/971; 340/974; 340/975; 340/946; 340/467; 340/439; 200/61.89
[58] Field of Search ................................. 340/965, 407.1, 340/971, 974, 975, 946, 467, 439; 200/86.5, 61.89

[56] References Cited

U.S. PATENT DOCUMENTS

| | | | |
|---|---|---|---|
| 2,827,621 | 3/1958 | Reichert et al. | 340/965 |
| 3,766,342 | 10/1973 | Stadelmann | 200/61.89 |
| 3,806,870 | 4/1974 | Kalajian | 340/467 |
| 4,333,070 | 6/1982 | Barnes | 340/439 |
| 4,484,191 | 11/1984 | Vavra | 340/965 |
| 4,788,526 | 11/1988 | Eckstein et al. | 340/467 |
| 4,901,055 | 2/1990 | Rosenberg et al. | 340/467 |
| 5,774,042 | 6/1998 | Johnston | 340/407.1 |

Primary Examiner—Benjamin C. Lee
Attorney, Agent, or Firm—Dougherty & Troxell

[57] ABSTRACT

A pilot warning system is disclosed for a helicopter having a main rotor rotatable about a yaw axis, a fuselage connected to the main rotor and having a tail boom with a controllable force mechanism to counter-act the torque exerted on the fuselage by rotation of the main rotor. The pilot warning system acts on foot pedals operatively connected to the controllable force mechanism, with the pedal movement controlling the amount of force exerted by the controllable force mechanism on the tail boom to the control the orientation of the helicopter fuselage about the yaw axis. A position sensing device senses the location of at least one of the foot pedals between its first and second positions, and a warning indicator operatively connected to the position sensing device provides a warning to the pilot when the sensed foot pedal reaches a predetermined distance from one of the first and second positions. The warning indicator provides a tactile warning into the pilot, such as vibration or shaking of the respective foot pedal to provide an unmistakable warning to the pilot that the foot pedal has reached a predetermined position near its maximum travel position. By such a warning system, the pilot is provided with a tactile input indicating that the helicopter yaw control system is approaching its maximum counter-rotating torque and that he/she should take appropriate action.

12 Claims, 3 Drawing Sheets

HELICOPTER ANTI-TORQUE LIMIT WARNING DEVICE

FIELD OF THE INVENTION

The present invention relates to a pedal position warning system for a helicopter yaw control pedal which warns the pilot by shaking the pedal when the pedal has traveled a predetermined amount of its maximum travel.

BACKGROUND OF THE INVENTION

Devices for shaking the control column or "stick" which controls fixed-wing aircraft are well known and provide an unmistakable warning of an impending stall. Such devices are typically mounted on the aircraft's control column or "stick" and provide a high amplitude, low frequency vibration to signal the pilot of an impending stall. Such signals provide an unmistakable warning to the pilot, which cannot be confused with other warnings and signals typically present in an aircraft cockpit. Control column shakers of various designs are manufactured and sold by Safe Flight Instrument Corporation of White Plains, N.Y., the assignee of the present invention.

The use of a control column shaker in rotary wing aircraft is also known, as evidenced by U.S. Pat. No. 4,115,755 to Cotton. As disclosed therein, an alarm, such as a shaking of the collective pitch control lever of a helicopter, is used as an indication that the actual acceleration exceeds the permissible acceleration. As disclosed by this reference, the structural envelope of the helicopter, as defined by weight, air speed, rotor rpm, air density and collective stick position, is used as an indication of permissible loading of the helicopter rotor. Cotton also teaches the use of a gross measure of the aircraft weight, density of the air, air speed, collective pitch and rotor speed of the aircraft as indices of a table look-up to determine the maximum permissible aircraft acceleration under such flight conditions, which is then compared against the actual aircraft acceleration to determine when the aircraft is maneuvered close to a loading which exceeds the structural envelope.

Controls for a single rotor helicopter typically include a cyclic control stick which movement controls the movement of the helicopter about the roll axis and the pitch axis, a collective control stick which controls the vertical movement of the helicopter by collectively adjusting the pitches of the rotor blades, and foot pedals which control the orientation of the helicopter about the yaw axis. Typically, such yaw control involves a tail rotor located near the end of the tail boom of the helicopter and rotating in a plane generally perpendicular to the plane of rotation of the main rotor. Movement of the fuselage of the helicopter about the yaw axis is achieved by pushing on one of the left and right foot pedals, which movement typically adjusts the pitch of the tail rotor thereby increasing, or decreasing the force on the tail boom which counteracts the rotational force exerted on the fuselage of the helicopter by the power plant during rotation of the main rotor blade.

While it is known to incorporate a force mechanism through the tail boom of the helicopter to direct a jet of air or other gas laterally through the end of the tail boom or over the exterior of the tail boom, thereby eliminating the need for a tail rotor, the magnitude of such a lateral force is controlled by the foot pedals so as to control the yaw orientation of the helicopter fuselage.

Given the ever increasing torque capabilities of modern helicopter power plants, circumstances may arise, especially under rapid helicopter ascent, in which the force exerted by the tail rotor, or other yaw control force mechanism, is incapable of counteracting the counter-rotational force exerted on the fuselage by the aircraft power plant. Such circumstances, quite obviously, are undesirable and may result in the loss of control of the helicopter by the pilot.

It is believed that there is a significant need for a warning system which will alert the pilot as to the impending maximum force exerted by the tail rotor, or other force mechanism, in a direction to counteract the rotational forces imposed on the helicopter fuselage by the power plant. Given the warning of an approach of such maximum force, it may then be possible for the pilot to adjust the other helicopter controls to avoid any undesired movement of the helicopter fuselage about the yaw axis due to insufficient rotor force. Such a warning system should provide an unmistakable warning to the pilot and should not be confused with other aircraft warning signals.

SUMMARY OF THE INVENTION

A pilot warning system is disclosed for a helicopter having a main rotor rotatable about a yaw axis, a fuselage connected to the main rotor and having a tail boom with a controllable force mechanism to counter-act the torque exerted on the fuselage by rotation of the main rotor. The pilot warning system acts on foot pedals operatively connected to the controllable force mechanism, with the pedal movement controlling the amount of force exerted by the controllable force mechanism on the tail boom to the control the orientation of the helicopter fuselage about the yaw axis. A position sensing device senses the location of at least one of the foot pedals between its first and second positions, and a warning indicator operatively connected to the position sensing device provides a warning to the pilot when the sensed foot pedal reaches a predetermined distance from one of the first and second positions. The warning indicator provides a tactile warning to the pilot, such as vibration or shaking of the respective foot pedal to provide an unmistakable warning to the pilot that the foot pedal has reached a predetermined position near its maximum travel position. By such a warning system, the pilot is provided with a tactile input indicating that the helicopter yaw control system is approaching its maximum counter-rotating torque and that he/she should take appropriate action.

The tactile warning can be provided by a shaker which is operatively associated with the foot pedal, either directly attached to the foot pedal, or to the foot pedal operating mechanism, which is activated when the pedal reaches the predetermined position. Such buffeting or shaking of the pedal provides an unmistakable warning to the pilot.

The present invention also envisions a pedal shaker that provides an increased level of shaking or vibration as the pedal approaches its maximum travel position. Such increases may occur in discreet steps according to the pedal travel, or may occur as an continuum as the pedal approaches its maximum position, with the severity of the vibration, or the frequency of the vibration increasing as the pedal approaches its maximum travel position.

DETAILED DESCRIPTION OF THE PREFERRED EMBODIMENTS

Figure 1:
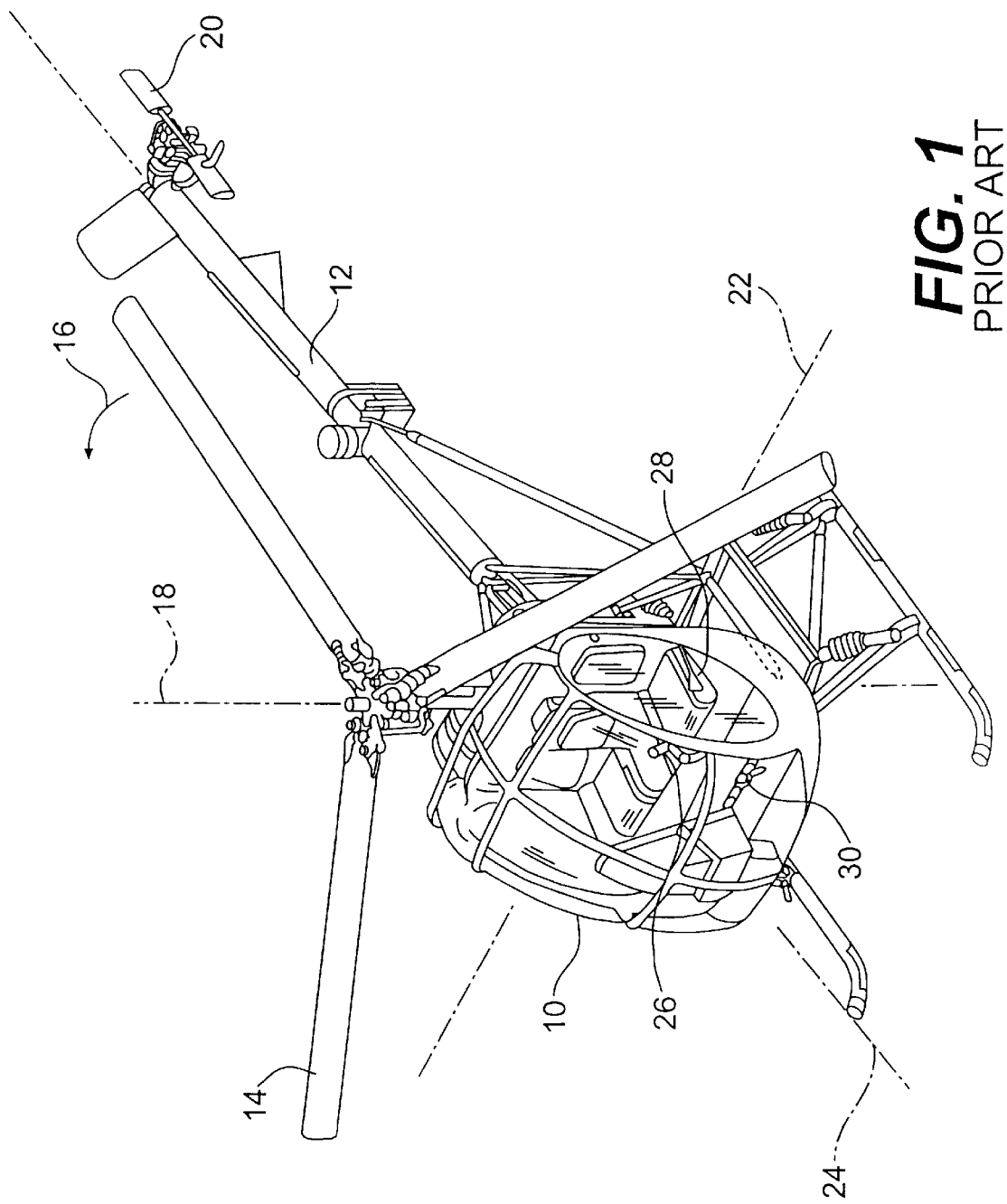
FIG. 1 is a perspective view of a known type of helicopter.

A helicopter having a single main rotor is illustrated in FIG. 1 and typically comprises a fuselage 10, from which tail boom 12 extends. Attached to fuselage 10 is a motor (not shown) which drives the main rotor 14 in the direction of arrow 16 about the yaw axis 18. A tail rotor 20, usually located near the distal end of the tail boom 12 is also rotatably driven by the motor and exerts a force on the tail boom 12 and, consequently, the fuselage 10, which counteracts the torque exerted on these elements by the motor once the helicopter is off the ground.

Control of the helicopter about the pitch axis 22 and the roll axis 24 is achieved in known fashion by the cyclical pitch control stick 26. The collective pitch control stick 28 collectively adjusts the pitches of the blades of the main rotor 14 to control the vertical movement of the helicopter along the yaw axis 18. Movement of the fuselage and tail rotor about the yaw axis 18 is controlled by foot pedals 30 which, in known fashion, vary the pitch of the tail rotor blades to vary the force exerted by the tail rotor 20 on the tail boom 12.

Figure 2:
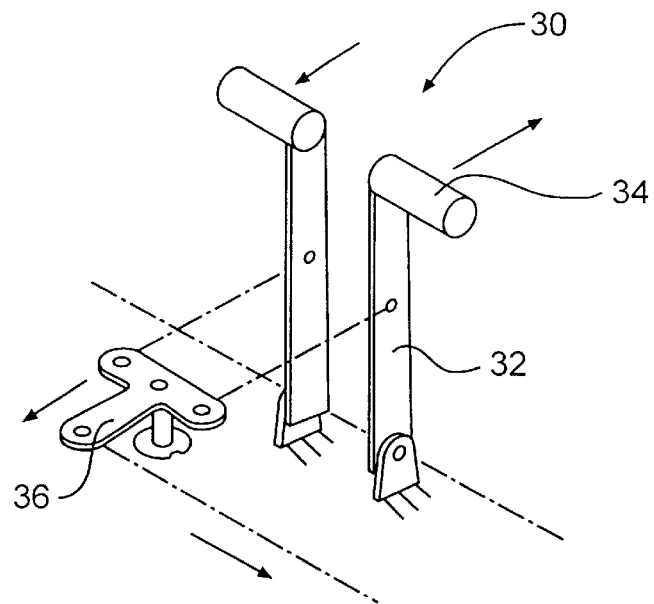
FIG. 2 is a perspective view of a known type of helicopter yaw control pedal assembly.

As illustrated in more detail in FIG. 2, foot pedals 30 each comprise a foot pedal shaft 32 pivotally attached to the fuselage structure at one end and a foot bar portion 34 on which the pilot's feet exert moving forces on the foot pedals 30. The foot pedals 32 may be connected to a mechanism, such as a bell crank 36, to transmit the motions of the pedals 30 to a known control system for adjusting the pitch of the blades on the tail rotor 20.

With the ever increasing power outputs of modem aircraft power plants, it is possible, under extreme flight conditions, for the torque exerted on the fuselage and tail boom of the helicopter by the motor to be greater than the counteracting force exerted on the tail boom by the tail rotor 20 even when the tail rotor 20 is at maximum pitch. Should this occur, it would not be possible for the pilot to properly control the orientation of the helicopter about the yaw axis 18 even by depressing the appropriate foot pedal to its maximum travel position. It is possible that the pilot would not realize such a condition existed until the foot pedal reached its maximum travel, at which point the loss of control has already occurred. Thus, it is readily apparent that a need exists for a system which will unmistakably warn the pilot that the helicopter foot pedal is approaching its maximum travel position to enable the pilot the take corrective action before encountering the situation in which the tail rotor cannot control the orientation of the helicopter about the yaw axis.

Although the present invention will be described in conjunction with a helicopter having a tail rotor, it is to be understood that the principals elucidated herein are equally applicable helicopters which direct a gas flow outwardly through the tail boom, or which control the air flow across the tail boom to provide yaw control.

Figure 3:
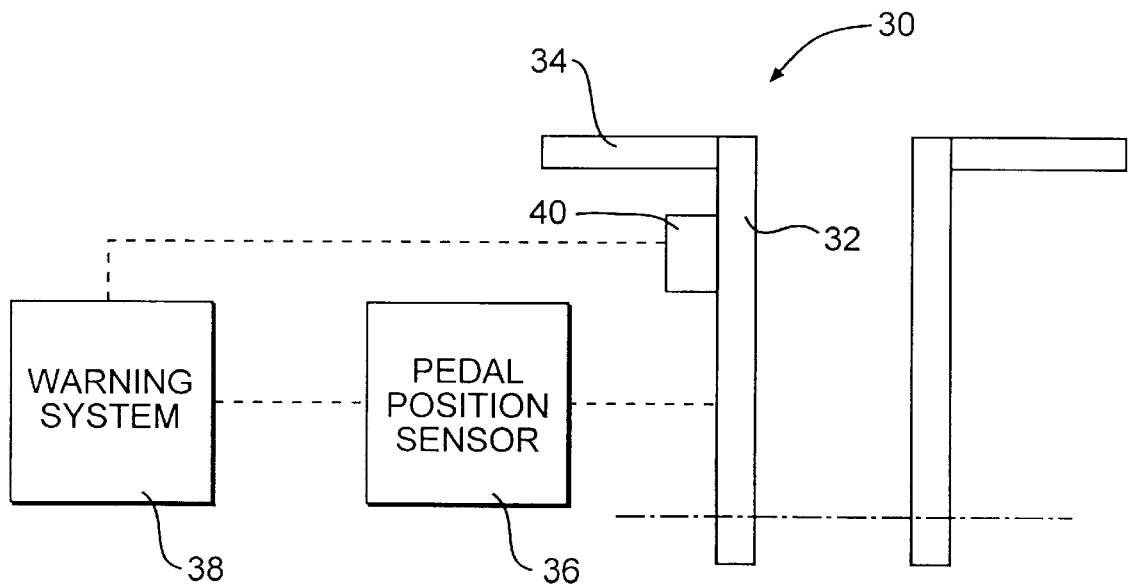
FIG. 3 is a schematic representation of the pedal position warning system according to the present invention.

As schematically illustrated in FIG. 3, the present invention incorporates a pedal position sensor 36 to sense the position of the pedal 30 between its filly released and fully applied positions. Such a pedal position sensor may be of any known type such that upon the pedal 30 reaching a predetermined distance from its maximum travel position, i.e. approximately 25 percent of the total travel from the maximum travel position, the pedal position sensor will generate a signal to a warning system 38 which incorporates a pedal shaker 40. Upon activation, the pedal shaker 40 will vibrate the foot pedal to provide an unmistakable indication to the pilot that the pedal is nearing its maximum travel position and, that the pilot should take corrective action to ensure that yaw control over the helicopter is maintained. The warning system 38 may incorporate other forms of tactile warnings to the pilot, visual warnings, or audible warnings in lieu of, or in conjunction with the shaker 40.

The warning system need only be associated with one of the helicopter foot pedals, that foot pedal being the one which increases the counter-acting force exerted on the fuselage of the helicopter against the torque exerted on the helicopter by the power plant. The predetermined point at which the shaker is actuated may also vary according to each particular application. However, the pilot should be given sufficient warning to enable him/her to take corrective action before the pedal reaches its maximum travel position.

It is envisioned that the shaker 40 may provide a constant frequency or amplitude of vibration once it has been actuated, or the frequency and/or amplitude of the vibration may increase as the pedal approaches its maximum travel position. The increase may either be continuously, or may be in discreet steps reaching a maximum at the point of maximum pedal travel.

Figure 4:
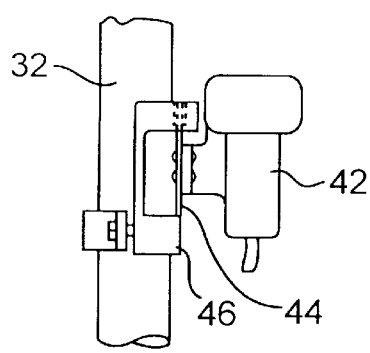
FIG. 4 is an elevational view of a pedal shaft having a shaker device attached thereto.

Although the shaker 40 has been disclosed as being attached directly to the pedal shaft 32, it is to be understood that the shaker may also be operatively connected to other parts of the tail rotor pitch control mechanism as long as the vibration from the shaker is imparted to the appropriate pedal. FIG. 4 illustrates a first type of shaker 42 directly attached to the pedal shaft 32. In this particular installation, the shaker 42 is attached to a leaf spring 44 which, in turn, is attached at one end, in this particular instance the bottom end, to a clamp 46 that is clamped directly to the pedal shaft 32.

Figure 5:
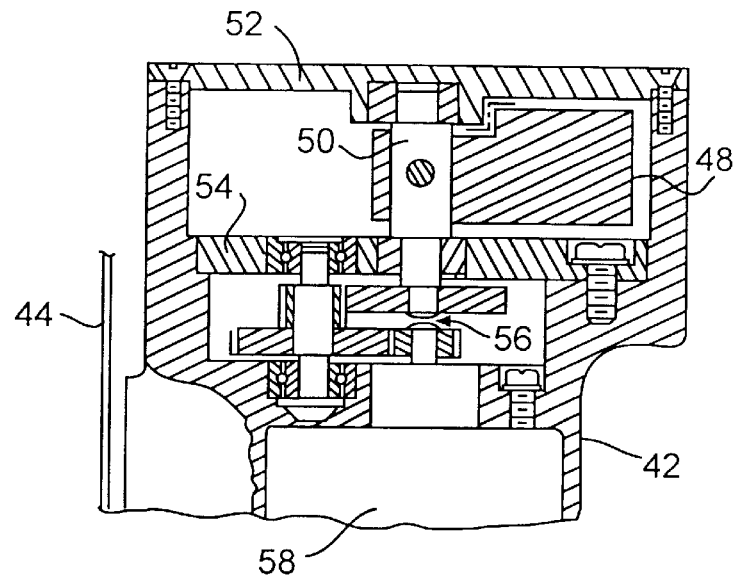
FIG. 5 is a partial, enlarged, cross-sectional view of the shaker mechanism illustrated in FIG. 4.

The upper portion of the shaker 42 is shown in more detail in FIG. 5. As can be seen, a weight 48 is eccentrically mounted on shaft 50 which is rotatably supported in opposite casing sides 52 and 54. Shaft 50 is rotated by gear drive train 56 which, in turn, is rotated by electric motor 58. As can be seen, rotation of the output shaft of the electric motor 58 will cause rotation of the eccentric weight 48 about the axis of shaft 50 to cause vibration of the shaker 42. The vibration will be imparted to the pedal shaft 32 by movement of the shaker 42 and the leaf spring 44 to provide an unmistakable warning to the helicopter pilot.

Figure 6:
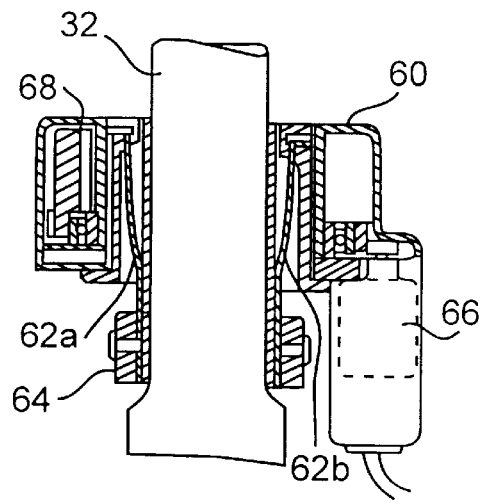
FIG. 6 is a front view, partially broken away, illustrating another type of shaker mounted to the pedal shaft.

Shakers are also known which are concentrically mounted about the shaft to be vibrated. This configuration is illustrated in FIG. 6 where it can be seen that shaker 60 is concentrically mounted on pedal shaft 32. The shaker 60 is attached to upper ends of leaf springs 62a and 62b which are directly clamped to the pedal shaft 32 at their lower ends by clamp 64. Motor 66 will drive annular eccentric weight 68 within the casing of the shaker 60 to vibrate the casing, which vibration is transferred directly to the pedal shaft 32 by motion of the casing and the leaf springs 62a and 62b.

Figure 7:
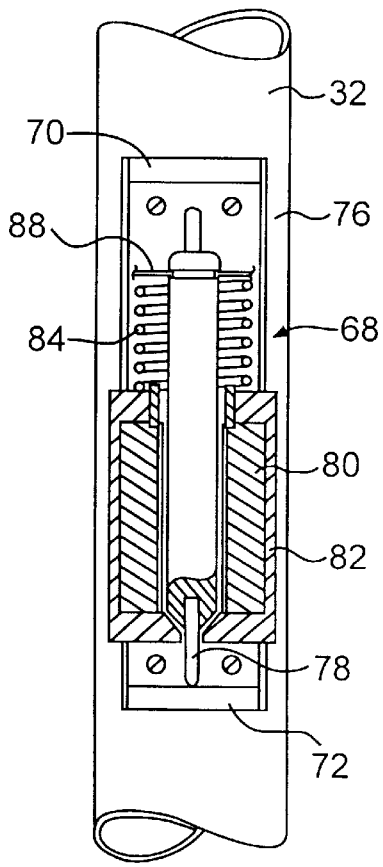
FIG. 7 is an elevational view of another type of shaker mechanism attached to the pedal shaft.

FIG. 7 illustrates a reciprocating type shaker attached to the pedal shaft 32. The reciprocating shaker 68 comprises end plates 70 and 72 formed on a bracket that is attached to the pedal shaft 32. A reciprocating plunger 74 is located between the end plates 70 and 72, the plunger 74 having strikers 76 and 78 extending from opposite ends thereof At least a portion of the plunger 74 is surrounded by a solenoid which includes a solenoid coil 80 and a magnetic circuit 82. Coil spring 84 bears against one end of the solenoid and against a plate 88 attached to the plunger 74 to bias the plunger in one direction such that one of the strikers 76 or 78 contacts a respective end plate 70, 72. As can be seen, when the solenoid is energized and de-energized, the plunger 74 will reciprocate back and forth along its longitudinal axis such that alternately, striker 76 strikes end plate 70 and striker 78 strikes its associated end plate 72 to impart a vibration to the pedal shaft 32. In each of the aforementioned shakers, the warning system will control either the electric motor which rotates the eccentric weight, or will control the energizing and the de-energizing of the solenoid to reciprocate the plunger.

The foregoing description is provided for illustrative purposes only and should not be construed as in any way limiting this invention, the scope of which is defined solely by the appended claims.

I claim:

1. A counter-torque indicating system for a helicopter comprising:
   a) a helicopter fuselage on which is rotatably mounted a main rotor such that rotation of the main rotor exerts a torque on the fuselage rotating the fuselage about a yaw axis in a first direction;
   b) a controllable counter-torque mechanism acting on the fuselage and exerting a counter-torque thereon to rotate the fuselage about the yaw axes in a second direction opposite to the first direction;
   c) at least one foot pedal mounted on the fuselage and connected to the controllable counter-torque mechanism, the at least one foot pedal movable between an initial position and a maximum counter-torque position in which a maximum counter-torque is exerted on the fuselage by the controllable counter-torque mechanism;
   d) a position sensing device sensing the location of the at least one foot pedal between the initial and maximum counter-torque positions, the position sensing device generating a signal when the at least one foot pedal reaches a predetermined distance from the maximum counter-torque position; and,
   e) a warning system connected to the position sensing device and including a tactile warning indicator acting on the at least one foot pedal whereby the signal from the position sensing device actuates the warning system including the tactile warning indicator to provide a tactile indication to a pilot of the helicopter of the location of the at least one foot pedal relative to the maximum counter-torque position.

2. The counter-torque indicating system of claim 1 wherein the tactile warning indicator comprises a shaker mechanism operatively connected to the at least one foot pedal to produce a vibration in the at least one foot pedal when the at least one foot pedal reaches the predetermined distance from the maximum counter-torque position.

3. The counter-torque indicating system of claim 2 wherein the shaker mechanism is mounted on the at least one foot pedal.

4. The counter-torque indicating system of claim 2 wherein the shaker mechanism comprises an eccentrically mounted weight rotated by an electric motor about an axis whereby the inertial rotation of the weight produces the vibration of the at least one foot pedal.

5. The counter-torque indicating system of claim 2 wherein the shaker mechanism comprises a reciprocating plunger, an electromagnetic coil acting on the plunger so as to reciprocate the plunger, and end plates contacted by opposite ends of the plunger as the plunger reciprocates.

6. The counter-torque indicating system of claim 1, wherein the controllable counter-torque mechanism comprises:
   a) a tail boom extending from the fuselage and having a distal end portion; and,
   b) a tail rotor rotatably mounted on the end portion of the tail boom, the tail rotor having at least one tail rotor blade with variable pitch whereby movement of the at least one foot pedal varies the pitch of the at least one tail rotor blade to control the amount of counter-torque exerted on the fuselage.

7. The counter-torque indicating system of claim 1, wherein the tactile warning indicator comprises a shaker mechanism producing a vibration in the at least one foot pedal when the warning system is actuated.

8. The counter-torque indicating system of claim 7, wherein the shaker mechanism is mounted on the at least one foot pedal.

9. The counter-torque indicating system of claim 7, wherein the shaker mechanism vibrates the at least one foot pedal at a constant frequency.

10. The counter-torque indicating system of claim 7, wherein the shaker mechanism vibrates the at least one foot pedal at a constant amplitude.

11. The counter-torque indicating system of claim 7, wherein the shaker mechanism vibrates the at least one foot pedal with increasing frequency as the at least one foot pedal approaches the maximum counter-torque position.

12. The counter-torque indicating system of claim 7, wherein the shaker mechanism vibrates the at least one foot pedal with increasing amplitude as the at least one foot pedal approaches the maximum counter-torque position.

* * * * *